US012044291B2

(12) United States Patent
Matsunaga et al.

(10) Patent No.: US 12,044,291 B2
(45) Date of Patent: *Jul. 23, 2024

(54) DRIVING APPARATUS (71) Applicant: HONDA MOTOR CO., LTD., Tokyo (JP)

(72) Inventors: Naoki Matsunaga, Wako (JP); Tsuyoshi Yoshigasaki, Wako (JP); Kenta Kohigashi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 982 days.

This patent is subject to a terminal disclaimer.

(21) Appl. No.: 17/004,436

(22) Filed: Aug. 27, 2020

(65) Prior Publication Data
US 2020/0393019 A1  Dec. 17, 2020

Related U.S. Application Data (63) Continuation of application No. PCT/JP2018/008058, filed on Mar. 2, 2018.

(51) Int. Cl.
*F16H 1/20* (2006.01)
*F16D 67/02* (2006.01)
(Continued)

(52) U.S. Cl.
CPC .............. *F16H 1/20* (2013.01); *F16D 67/02* (2013.01); *H02K 7/006* (2013.01); *H02K 7/112* (2013.01); *H02K 7/116* (2013.01); *B60K 7/0007* (2013.01); *B60K 2007/0092* (2013.01); *F16D 2011/002* (2013.01); *F16D 11/14* (2013.01);
(Continued)

(58) Field of Classification Search
CPC ....................................................... H02K 7/112
See application file for complete search history.

(56) References Cited

U.S. PATENT DOCUMENTS 1,663,607 A   3/1928 Naul
2,273,404 A   2/1942 Healey
(Continued)

FOREIGN PATENT DOCUMENTS

CN   204509779 U   7/2015
JP   51-68034 A    6/1976
(Continued)

OTHER PUBLICATIONS

Non-Final Office Action dated Sep. 10, 2021, issued in U.S. Appl. No. 17/004,472 (40 pages).
(Continued)

*Primary Examiner* — Vicky A Johnson
(74) *Attorney, Agent, or Firm* — WHDA, LLP (57) ABSTRACT

A driving apparatus 100 includes a motor 20 that generates drive power and power transmission units 30, 40, and 50 that transmit drive power of the motor 20 to an output shaft 60. The power transmission units 30, 40, and 50 include a brake mechanism 40 that brakes rotation of the output shaft 60 and a deceleration mechanism 50 that converts a torque of the motor 20, and transmits a resultant to the output shaft 60, and the brake mechanism 40 is arranged at a part before the deceleration mechanism 50, and the deceleration mechanism 50 is arranged at a part before the output shaft 60.

3 Claims, 9 Drawing Sheets (51) Int. Cl.
 *H02K 7/00*  (2006.01)
 *H02K 7/112*  (2006.01)
 *H02K 7/116*  (2006.01)
 *B60K 7/00*  (2006.01)
 *F16D 11/00*  (2006.01)
 *F16D 11/14*  (2006.01)
 *F16D 55/02*  (2006.01)
 *F16D 121/14*  (2012.01)
 *F16D 125/36*  (2012.01)
 *F16D 125/64*  (2012.01)

(52) U.S. Cl.
 CPC .......... *F16D 55/02* (2013.01); *F16D 2121/14* (2013.01); *F16D 2125/36* (2013.01); *F16D 2125/64* (2013.01)

(56) References Cited

U.S. PATENT DOCUMENTS

| | | | |
|---|---|---|---|
| 2,617,051 A | * | 11/1952 | Fuge ..................... H02K 7/112 |
| | | | 310/76 |
| 5,655,986 A | | 8/1997 | Wilson et al. |
| 9,403,429 B2 | | 8/2016 | Baumgartner et al. |
| 2002/0144868 A1 | | 10/2002 | Kuivamaki |
| 2007/0062774 A1 | | 3/2007 | Akagi et al. |
| 2010/0294608 A1 | | 11/2010 | Stadele et al. |
| 2014/0144744 A1 | | 5/2014 | Hirawaki |
| 2017/0166061 A1 | | 6/2017 | Isono et al. |

FOREIGN PATENT DOCUMENTS

| | | | |
|---|---|---|---|
| JP | 2010-525267 A | | 7/2010 |
| JP | 2015-123890 A | | 7/2015 |
| JP | 2015123890 A | * | 7/2015 |
| JP | 2016-92995 A | | 5/2016 |
| WO | 2008/128599 A1 | | 10/2008 |

OTHER PUBLICATIONS

Non-Final Office Action dated Jul. 29, 2021, issued in U.S. Appl. No. 17/004,343 (15 pages).
International Search Report dated May 29, 2018, issued in counterpart International Application No. PCT/JP2018/008058 (1 page).
International Search Report dated May 29, 2018, issued in related International Application No. PCT/JP2018/008056 (1 page).
International Search Report dated May 29, 2018, issued in related International Application No. PCT/JP2018/008057 (1 page).

* cited by examiner

DRIVING APPARATUS

CROSS-REFERENCE TO RELATED APPLICATION(S)

This application claims priority to and the benefit of PCT/JP2018/008058 filed on Mar. 2, 2018, the entire disclosure of which is incorporated herein by reference.

BACKGROUND OF THE INVENTION

Field of the Invention

The present invention relates to a driving apparatus in which a motor is used as a driving source.

Description of the Related Art

Japanese Patent Laid-Open No. 2016-092995 discloses an in-wheel motor that is incorporated in a wheel of an electric automobile or the like (FIG. 8). The in-wheel motor can independently control driving of each axle, and thus can reduce energy loss.

The in-wheel motor is mounted in each wheel of a vehicle, for example, and thus there is demand for a reduction in size and weight.

SUMMARY OF THE INVENTIONS

The present invention has been made in consideration of the aforementioned problems, and realizes a driving apparatus whose size can be reduced.

In order to solve the aforementioned problems, the first aspect of the present invention provides a driving apparatus 100 including: a motor 20 that generates drive power; and power transmission units 30, 40, and 50 that transmit drive power of the motor 20 town output shaft 60, wherein the power transmission units 30, 40, and 50 include a brake mechanism 40 that brakes rotation of the output shaft 60 and a deceleration mechanism 50 that converts a torque of the motor 20, and transmits a resultant to the output shaft 60, and wherein the brake mechanism 40 is arranged at a part before the deceleration mechanism 50, and the deceleration mechanism 50 is arranged at a part before the output shaft 60.

According to the present invention, it is possible to realize a driving apparatus whose size can be reduced.

DESCRIPTION OF THE EMBODIMENT

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

An embodiment of the present invention will be described below in detail with reference to the attached drawings.

Apparatus Configuration

Figure 2A:
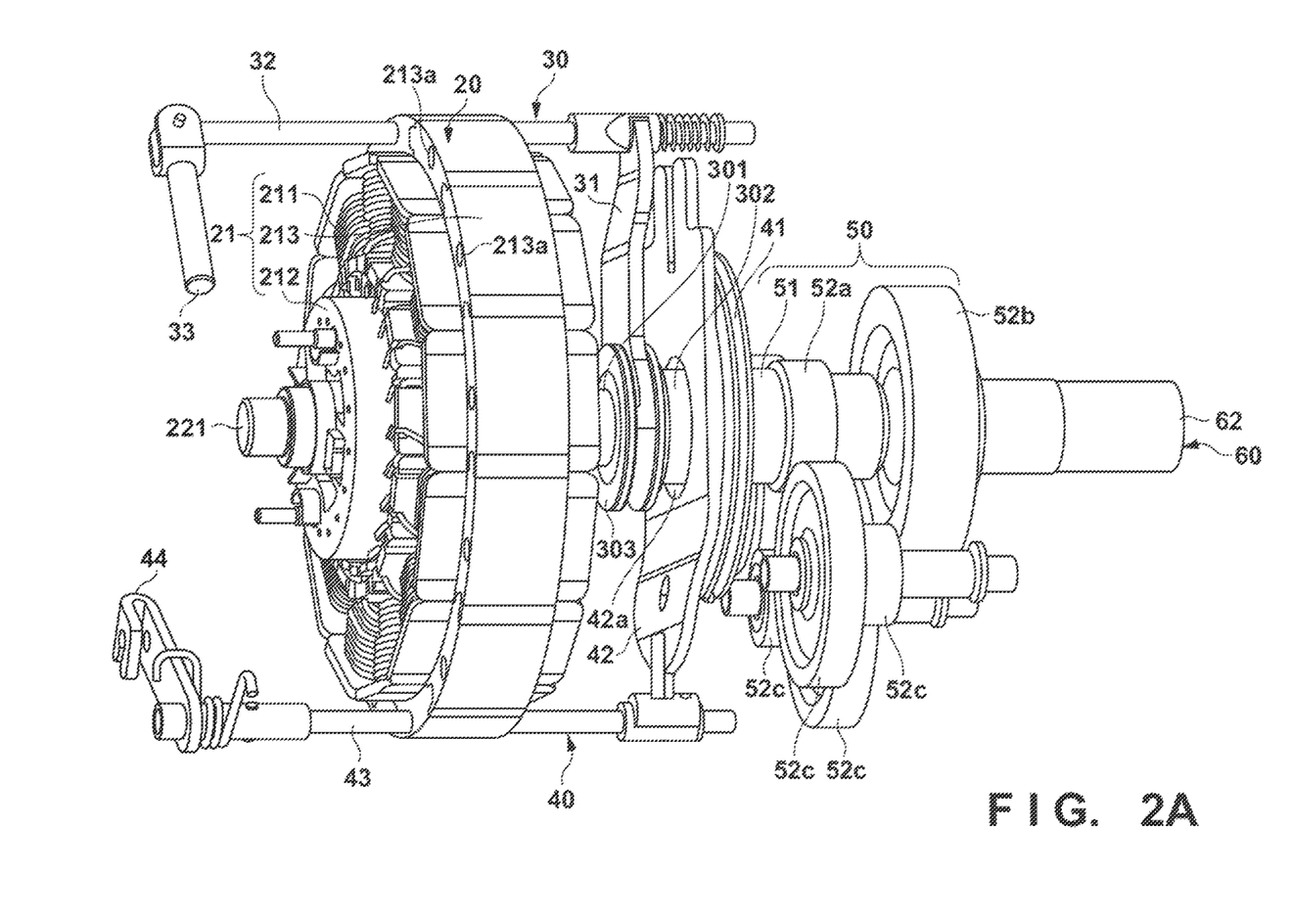
FIG. 2A is a perspective view of the internal configuration of a housing of the driving apparatus according to the embodiment of the present invention, when viewed from the input side.
Figure 2B:
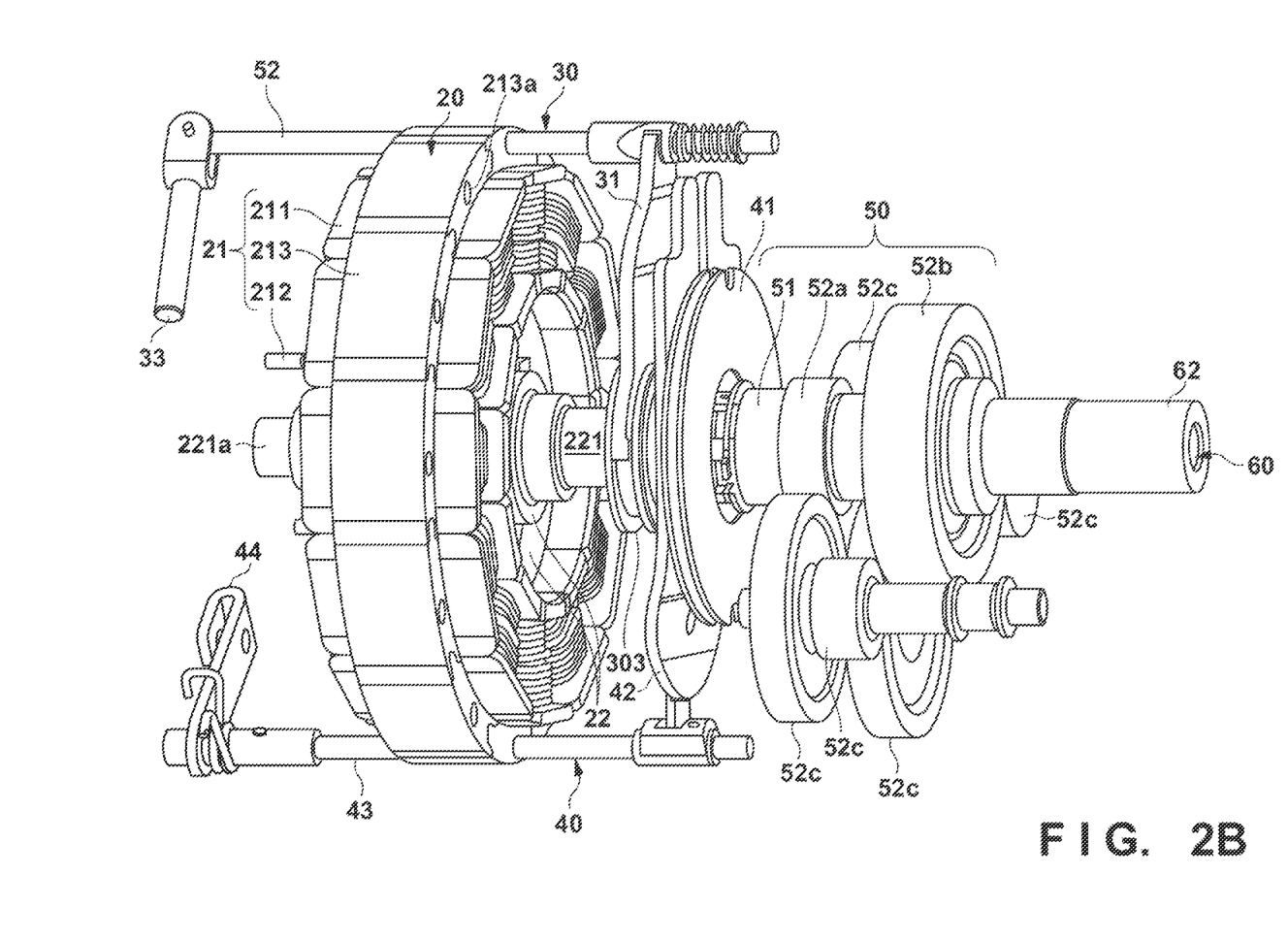
FIG. 2B is a perspective view of the internal configuration of the housing of the driving apparatus according to the embodiment of the present invention, when viewed from the output side.
Figure 3:
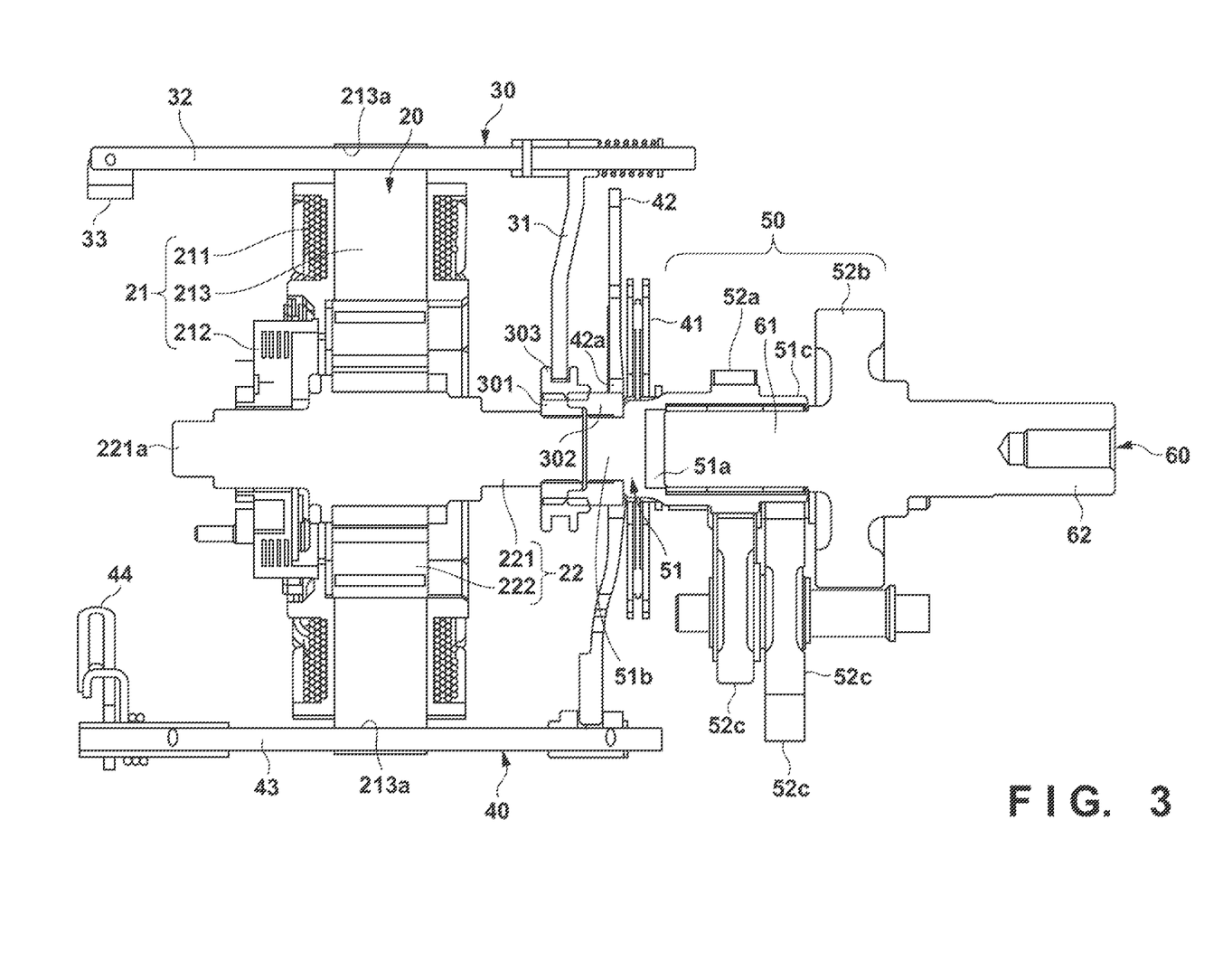
FIG. 3 is a cross-sectional view showing the internal configuration of the housing of the driving apparatus according to the embodiment of the present invention, the view taken in the axial direction.

First, an overall configuration of a driving apparatus 100 according to the present embodiment will be described with reference to FIGS. 1 to 3.

Note that, hereinafter, regarding a power transmission direction from a motor to an output shaft, a direction approaching the motor is referred to as an "input side", an "upstream side", or a "part before", and a direction separating from the motor is referred to as an "output side", a "downstream side", or a "part behind".

Figure 1:
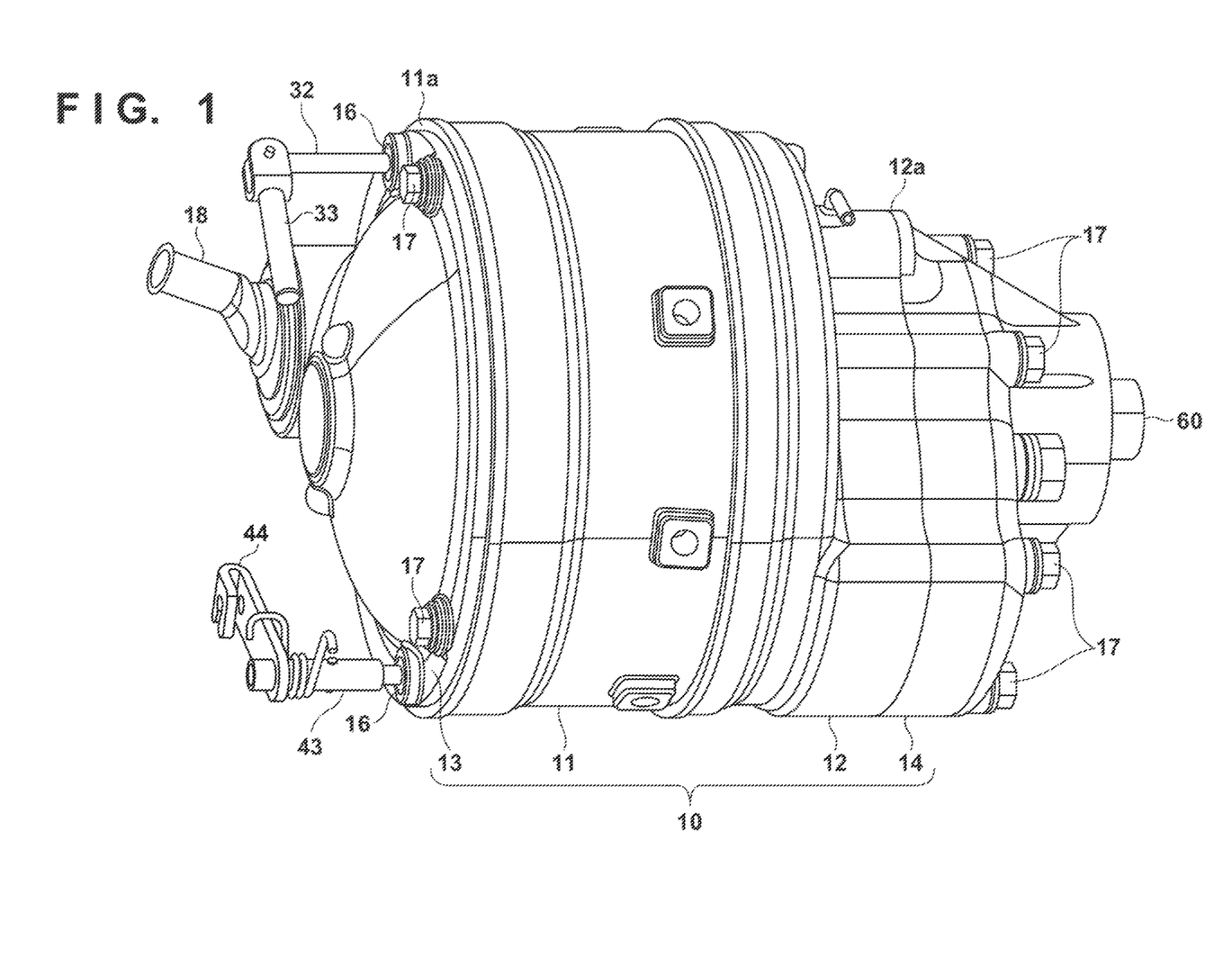
FIG. 1 is an external view of a driving apparatus according to an embodiment of the present invention.

FIG. 1 is an external view of the driving apparatus 100 according to the present embodiment. FIG. 2A is a perspective view of the internal configuration of a housing of the driving apparatus 100 according to the present embodiment, when viewed from the input side. FIG. 2B is a view of the internal configuration of the housing of the driving apparatus 100 according to the present embodiment, when viewed from the output side. FIG. 3 is a cross-sectional view showing the internal configuration of the housing of the driving apparatus 100 according to the present embodiment, the view taken in the axial direction.

The driving apparatus 100 according to the present embodiment is a so-called in-wheel power unit that is incorporated in the wheel hub of each wheel of an electric automobile or an work machine such as a lawn mower or an agricultural equipment that the user boards and operates.

The driving apparatus 100 includes a housing 10, a motor 20, a clutch mechanism 30, a brake mechanism 40, a deceleration (reduction) mechanism 50, and an output shaft 60. The clutch mechanism 30, the brake mechanism 40, and the deceleration mechanism 50 comprise a power transmission mechanism for converting drive power generated in the motor 20 into power at a predetermined torque and rotation frequency, and transmitting the power at the predetermined torque and rotation frequency to the output shaft 60.

The housing 10 includes an input-side housing 11 that has a cylindrical outer shape with an input-side end portion 11a that is open, an output-side housing 12 that has a cylindrical outer shape with an output-side end portion 12a that is open, a dome-like input-side cover portion 13 for closing the opening of the input-side end portion 11a of the input-side housing 11, and a protruding output-side cover portion 14 for closing the opening of the output-side end portion 12a of the output-side housing 12.

The opening of the input-side end portion 11a of the input-side housing 11 is closed by the input-side cover portion 13 in a state where the motor 20 is held in the input-side housing 11. The input-side cover portion 13 is fixed to the input-side end portion 11a of the input-side housing 11 using long bolts 17 or the like. Also, rod insertion holes 16 into which a clutch rod 32 of a clutch operation unit and a brake rod 43 of a brake operation unit, which will be described later, are slidably inserted, and a wiring guide portion 18 for introducing wiring to the inside of the housing 10 in order to supply power to the motor 20 are formed in the input-side cover portion 13. The clutch rod 32 and the brake rod 43, in a state of being sealed using rubber bushes or the like, are inserted into the rod insertion holes 16. The opening of the output-side end portion 12a of the output-side housing 12 is closed by the output-side cover portion 14 in a state where the clutch mechanism 30, the brake mechanism 40, and the deceleration mechanism 50 are housed in the output-side housing 12. The output-side cover portion 14 is fixed to the output-side end portion 12a of the output-side housing 12 using bolts 17 or the like.

The motor 20 is a brushless motor that includes a stator portion 21 that has a hollow cylindrical outer shape and a columnar rotor portion 22 that is arranged coaxially with the stator portion 21, the stator portion 21 being disposed on the outer circumference of the rotor portion 22. In the stator portion 21, a plurality of coil portions 211 each obtained by winding a coil are arranged to be spaced by a predetermined angle in the circumferential direction. Also, the stator portion 21 is provided with a control unit 212 that includes an inverter circuit for controlling a current flowing in the coil portions 211 according to the position of the rotor portion 22, and the like. The rotor portion 22 includes a motor shaft 221 that outputs drive power and a columnar magnetic bodies 222. The magnetic bodies 222 are fixed coaxially with the motor shaft 221. The plurality of magnetic bodies 222 are arranged to be spaced by a predetermined angle in the circumferential direction in a state where the polarities of a plurality of magnets are alternatively reversed. The magnets are permanent magnets.

The stator portion 21 includes a hollow cylindrical stator iron core 213 that has the coil portions 211 disposed on both side faces thereof in the axial direction, an is positioned an held inside the input-side housing 11 by the stator iron core 21. On the stator iron core 213, a plurality of positioning holes 213a for positioning and holding the motor 20 in the input-side housing 11 are provided in the circumferential direction. The clutch rod 32 is then inserted into one of the plurality of positioning holes 213a, and the brake rod 43 is inserted into another. As a result of the long bolts 17 being inserted into the plurality of positioning holes 213a as knock pins when the input-side cover portion 13 is fixed to the opening of the input-side end portion 11a of the input-side housing 11, the stator iron core 213 is positioned relative to the input-side housing 11. Accordingly, the long bolts 17 for fixing the input-side cover portion 13 to the opening of the input-side end portion 11a of the input-side housing 11 are also used as means for positioning the stator iron core 213.

The clutch mechanism 30 switches the motor shaft 221 and an input shaft 51 of the deceleration mechanism 50 between a connected state (locked state) and a disconnected state (unlocked state). In the locked state, the motor shaft 221 and the input shaft 51 of the deceleration mechanism 50 are directly connected, and drive power that is output from the motor shaft 221 can be transmitted to the output shaft 60 via the deceleration mechanism 50. In the unlocked state, the motor shaft 221 and the input shaft 51 of the deceleration mechanism 50 are disconnected, and drive power that is output from the motor shaft 221 cannot be transmitted to the output shaft 60. A switch between the locked state and the unlocked state is made by the clutch operation unit. The clutch operation unit includes a clutch arm 31 that engages with a sleeve 303, the clutch rod 32 for operating the clutch arm 31, and a lever portion 33. The clutch operation unit can be operated by the user, and the sleeve 303 is displaced into a locked state or unlocked state in accordance with an operation on the clutch rod 32.

For example, when the driving apparatus 100 is mounted in a work machine, the user can easily move the work machine manually as a result of the clutch mechanism 30 being switched to the unlocked state.

The brake mechanism 40 includes a brake plate 41 coupled to the input shaft 51 of the deceleration mechanism 50 and a movable plate 42 that presses the brake plate 41. A switch is made to one of a braking state where the movable plate 42 abuts on and presses the brake plate 41 that rotates integrally with the input shaft 51 of the deceleration mechanism 50 and a non-braking state where the movable plate 42 separates from the brake plate 41. In the braking state, the movable plate 42 presses the brake plate 41 from the input side to the output side so as to decelerate and stop rotation of the input shaft 51 of the deceleration mechanism 50, and to suppress rotation of the input shaft 51 after it is stopped. In the non-braking state, the movable plate 42 is separated from the brake plate 41, and thus the input shaft 51 of the deceleration mechanism 50 enters a rotatable state. A switch between the braking state and the non-braking state is made by the brake operation unit. The brake operation unit includes the brake rod 43 for operating the movable plate 42, and a lever portion 44. The brake rod 43 can be operated by the user, and the movable plate 42 is displaced into the braking state or the non-braking state in accordance with an operation on the brake rod 43.

For example, when the driving apparatus 100 is mounted in a work machine, the brake mechanism 40 can decelerate or stop rotation of a wheel when the work machine is traveling.

The clutch rod 32 of the clutch mechanism 30 and the brake rod 43 of the brake mechanism 40 are arranged in an offset of 90° or more in the circumferential direction. In the present embodiment, the clutch rod 32 of the clutch mechanism 30 and the brake rod 43 of the brake mechanism 40 have a positional relation of being arranged on sides inverted by 180° with respect to the motor shaft 221.

The deceleration mechanism 50 includes the input shaft 51 and reduction gear train 52a to 52c. The brake plate 41 of the brake mechanism 40 is spline-coupled to the input shaft 51, and is switched between the locked state and the unlocked state relative to the motor shaft 221 by the clutch mechanism 30. A hollow portion 51a of the input shaft 51 formed in the shaft core supports an input-side end portion 61 of the output shaft 60 so as to be coaxially rotatable. In addition, the input gear 52a is provided on the input shaft 51. Also, the output gear 52b is provided on the output shaft 60. Moreover, a plurality of reduction gears 52c of the deceleration mechanism 50 are arranged on the outer circumference of the input shaft 51 at a position corresponding to the hollow portion 51a that pivotally supports the output shaft 60. Accordingly, space around an axis centered on the input shaft 51 can be saved. Drive power of the input shaft 51 is transmitted from the input gear 52a to the output gear 52b via the following gear train 52c, is converted into drive power at a predetermined torque and rotation frequency, and is transmitted to the output shaft 60.

Figure 4A:
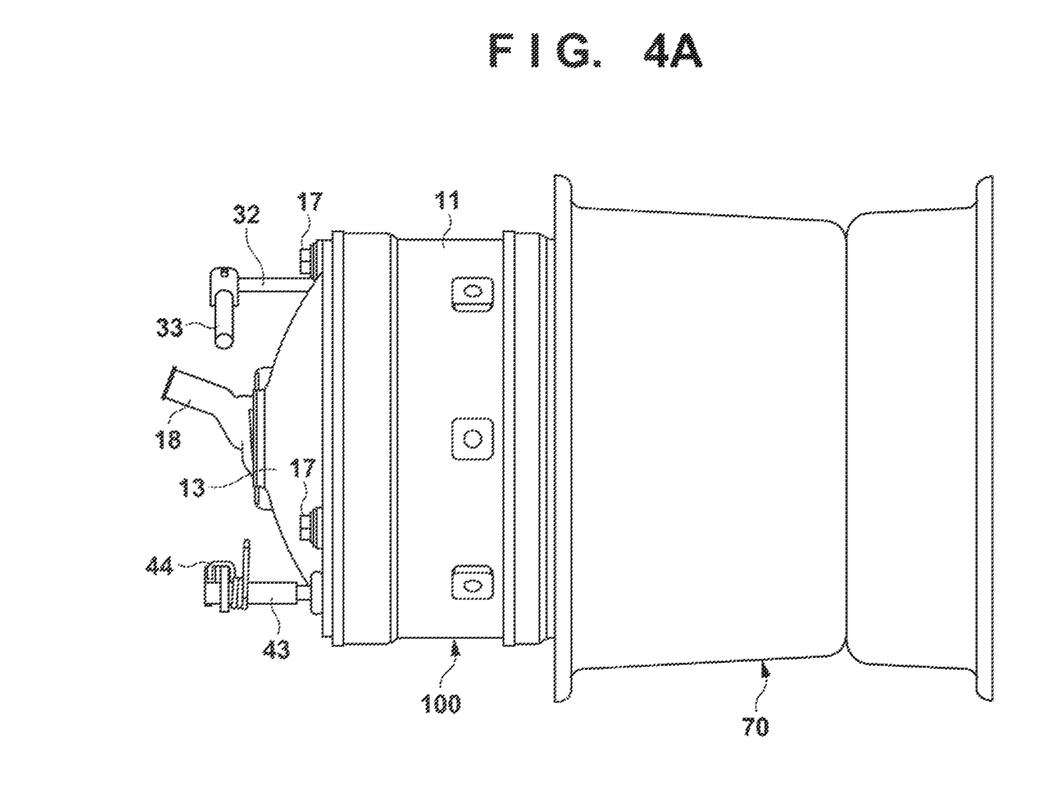
FIG. 4A is a side view of the driving apparatus according to the embodiment of the present invention when fixed to a wheel.
Figure 4B:
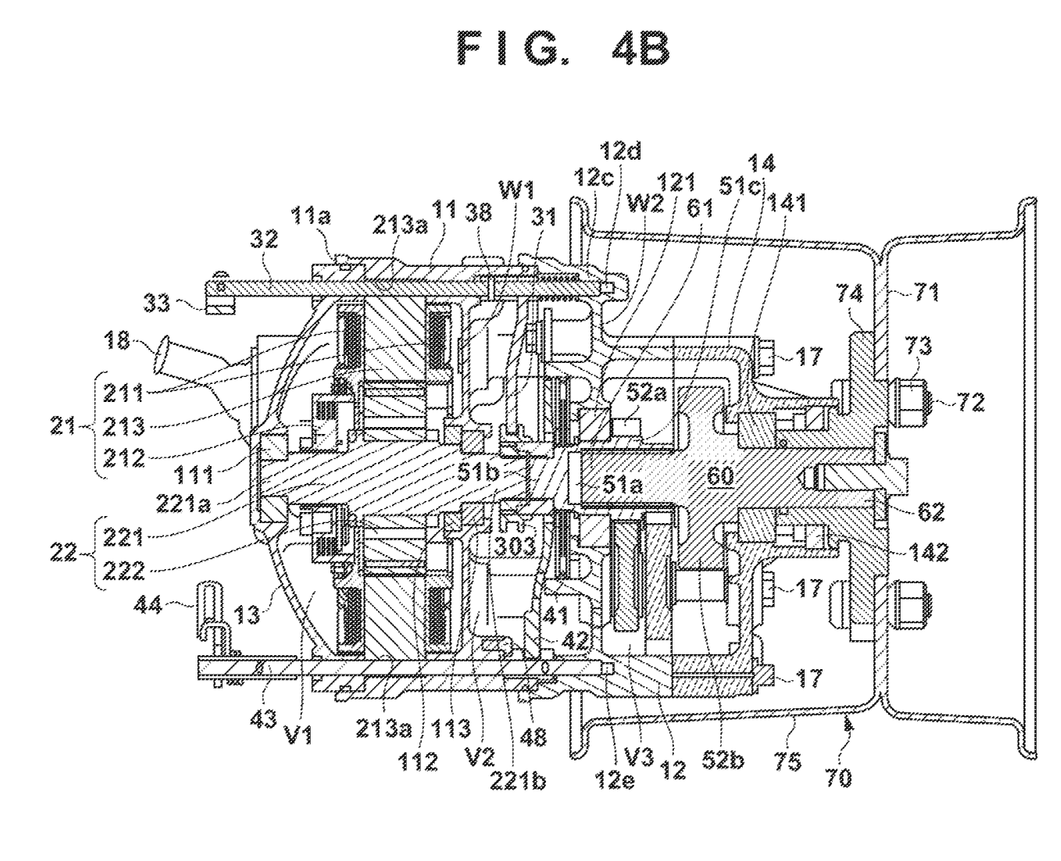
FIG. 4B is a cross-sectional view of FIG. 4A, taken in the axial direction.

The input-side end portion 61 of the output shaft 60 on the input side relative to the output gear 52b is rotatably supported by the hollow portion 51a of the input shaft 51 of the deceleration mechanism 50, and a disk-like hub attaching portion 74 for fixing a wheel hub 71 of a wheel 70 to be described later with reference to FIGS. 4A and 4B is provided in an output-side end portion 62 on the output side relative to the output gear 52b.

With the above-described configuration, the wheel 70 is rotated and driven using drive power output from the motor shaft 221.

Layout of Mechanisms

Next, a detailed configuration and layout of the motor 20, the clutch mechanism 30, the brake mechanism 40, the deceleration mechanism 50, and the output shaft 60 of the driving apparatus 100 according to the present embodiment will be described with reference to FIGS. 4A and 4B in addition to FIGS. 1 to 3.

FIG. 4A is a side view illustrating a state where the driving apparatus 100 according to the present embodiment is fixed to the wheel 70. FIG. 4B is a cross-sectional view of FIG. 4A shown in the axial direction. Note that, in FIGS. 4A and 4B, the same reference numerals are given to the same configuration as those in FIGS. 1 to 3.

In the input-side housing 11, a motor chamber V1 in which the motor 20 is disposed and a clutch brake chamber V2 in which the clutch mechanism 30, the brake mechanism 40, and an input-side end portion 51b of the input shaft 51 of the deceleration mechanism 50 are disposed are formed. The motor chamber V1 and the clutch brake chamber V2 are partitioned by a partition wall W1. The opening of the input-side end portion 11a of the input-side housing 11 is closed by the input-side cover portion 13, and the inside of the motor chamber V1 is kept air-tight.

The clutch brake chamber V2 in which the clutch mechanism 30, the brake mechanism 40, and the input-side end portion 51b of the input shaft 51 of the deceleration mechanism 50 are disposed, and a gear chamber V3 in which an output-side end portion 51c of the input shaft 51 of the deceleration mechanism 50 and a plurality of gears 52 are disposed are formed in the output-side housing 12. The clutch brake chamber V2 and the gear chamber V3 are partitioned by a partition wall W2. The opening of the output-side end portion 12a of the output-side housing 12 is closed by the output-side cover portion 14, and the inside of the gear chamber V3 is kept fluid-tight. The clutch brake chamber V2 and the gear chamber V3 are filled with lubricant oil.

An input-side end portion 221a of the motor shaft 221 is rotatably supported by a bearing 111 provided on the input-side cover portion 13, and an output-side end portion 221b is rotatably supported via bearings 112 and 113 provided on the partition wall W1. The input shaft 51 of the deceleration mechanism 50 is rotatably supported by a bearing 121 provided on the partition wall W2. The input-side end portion 61 of the output shaft 60 is rotatably supported by the hollow portion 51a of the input shaft 51, and a portion of the output-side end portion 62 near the output gear 52b is rotatably supported by a bearing 141 provided on the output-side cover portion 14.

The hub attaching portion 74 for fixing the wheel hub 71 of the wheel 70 using hub bolts 72 and hub nuts 73 is fixed to the output-side end portion 62 of the output shaft 60. The hub attaching portion 74 is attached to a leading end portion of the output-side end portion 62 of the output shaft 60 that is exposed to the outside from the output-side cover portion 14. The huh attaching portion 74 is rotatable supported by a bearing 142 provided at the opening end of the output-side cover portion 14.

In the driving apparatus 100 according to the present embodiment, the motor shaft 221, the clutch mechanism 30, the brake mechanism 40, the input shaft 51 of the deceleration mechanism 50, and the output shaft 60 are coaxially arranged in the stated order from the upstream side (input-side) of a power transmission path toward the downstream side (output-side).

In a conventional layout in which a motor shaft and an output shaft are not arranged coaxially, the size of the apparatus increases, and an ingenuity is required for supply of lubricant oil. For example, in a layout in which shafts are arranged vertically, an ingenuity for scraping lubricant oil using a gear, and guiding the lubricant oil to the bearings of the shafts is necessary.

In contrast, according to the present embodiment, a layout is adopted in which the motor shaft 221, the clutch mechanism 30 and the brake mechanism 40, and the input shaft 51 of the deceleration mechanism 50 are arranged coaxially, and are supported by the hollow portion 51a of the input shaft 51 such that the input shaft 51 of the deceleration mechanism 50 and the input-side end portion 61 of the output shaft 60 overlap each other in the radial direction. Furthermore, the motor 20 is disposed upstream of (at a part before) the clutch mechanism 30, and the brake mechanism 40 is disposed upstream of at a part before) the deceleration mechanism 50 and the output shaft 60.

As a result of adopting such a layout, the motor shaft 221 to the output shaft 60 can be arranged linearly in the axial direction, and thus the sizes of the shafts in the radial direction can be reduced, and the layout efficiency can be improved. Accordingly, a portion of the output-side housing 12 that holds the clutch mechanism 30, the brake mechanism 40, and the deceleration mechanism 50 as well as the output-side cover portion 14 that holds the output shaft 60 are held inward of a rim 75 of the wheel 70, and thus a space in the axial direction can be saved.

In addition, a rotation driving unit such as a traveling, wheel connected the output shaft 60 freely rotates as a result of preventing the brake mechanism 40 and the deceleration mechanism 50 from being affected by a cogging torque of the motor 20. As a result, it becomes easy to operate a work machine, a vehicle, or the like in which the rotation driving unit and the driving apparatus 100 are mounted, when the motor is not driven. In addition, since a torque before deceleration for the output shaft 60 (at a part before the output gear 52b) is smaller than a torque after deceleration (at a part behind the output gear 52b), the brake capacity can be reduced, and it is possible to reduce the sizes of the components of the brake mechanism 40. Moreover, when the driving apparatus 100 is mounted in an work machine, it is possible to reduce the diameter and capacity of the brake on a traveling wheel side.

Note that, in the present embodiment, a configuration example has been described in which both the clutch mechanism 30 and the brake mechanism 40 are provided, but a configuration may also be adopted in which only one of the clutch mechanism 30 and the brake mechanism 40 is provided, in accordance with usage.

Clutch Mechanism

Next, a detailed configuration of the clutch mechanism 30 in the driving apparatus 100 according to the present embodiment will be described with reference to FIG. 5 in addition to FIGS. 1 to 4B. Note that, in FIG. 5, the same reference numerals are given to the same configurations as those in FIGS. 1 to 4B.

Figure 5:
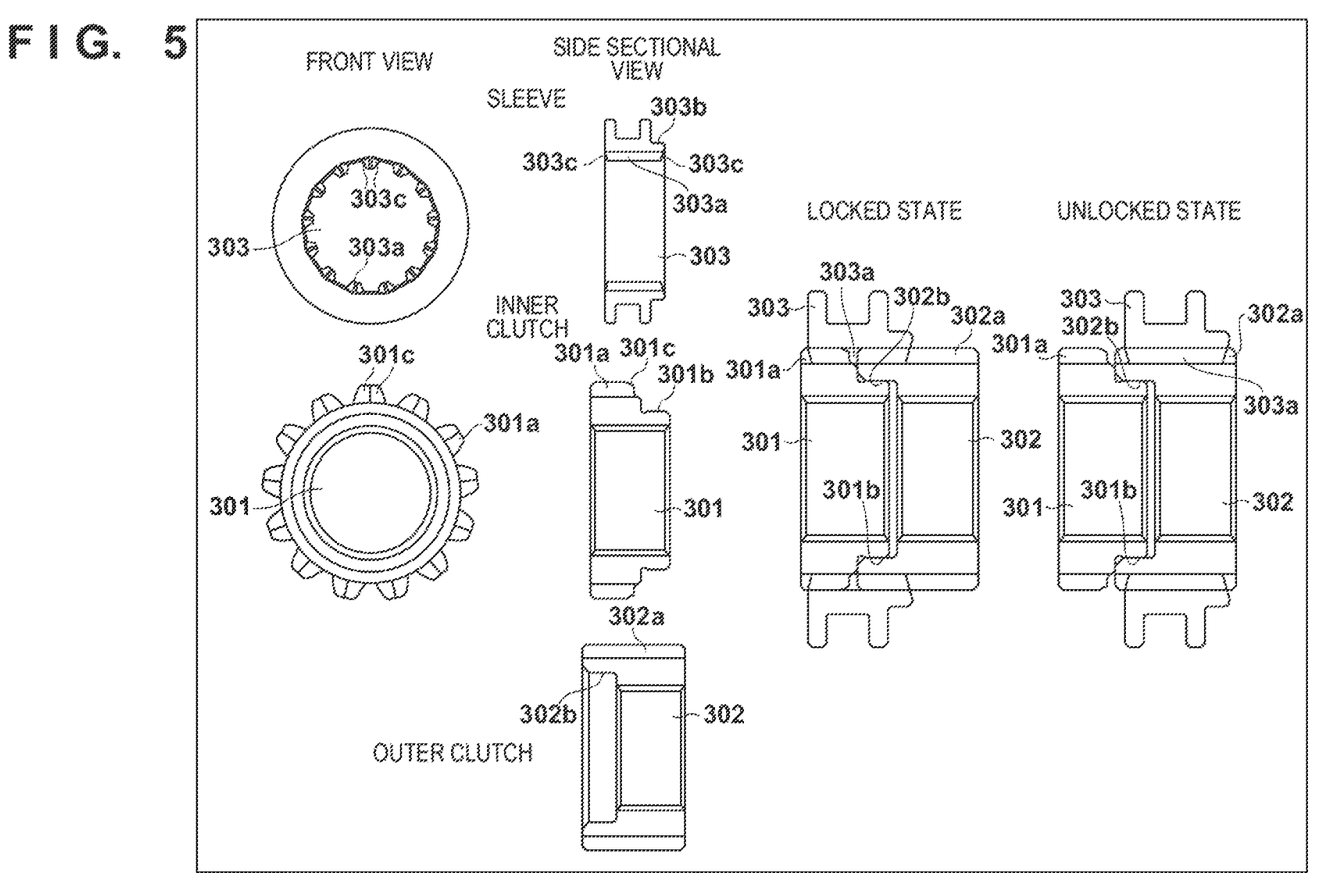
FIG. 5 is a diagram showing components of a clutch mechanism in the driving apparatus according to the embodiment of the present invention.

FIG. 5 is a diagram showing components of the clutch mechanism 30 in the driving apparatus 100 according to the present embodiment.

The clutch mechanism 30 includes an inner clutch 301, an outer clutch 302, and the sleeve 303. The inner clutch 301 is spline-coupled to the output-side end portion 221b of the motor shaft 221. The outer clutch 302 is spline-coupled to the input-side end portion 51b of the input shaft 51 of the deceleration mechanism 50. In addition, an inner spline 303a that engages with outer splines 301a and 302a respectively provided on the outer periphery faces of the inner clutch 301 and the outer clutch 302 is formed on the inner periphery surface of the sleeve 303. The sleeve 303 can move between the outer spline 302a of the outer clutch 302 and the outer spline 301a of the inner clutch 301 in the axial direction due to the clutch arm 31 and the clutch rod 32, and, in the unlocked state, the sleeve 303 is engaged only with the outer spline 302a of the outer clutch 302, and, in the locked state, engages with both the outer spline 302a of the outer clutch 302 and the outer spline 301a of the inner clutch 301.

In addition, the outer clutch 302 is accommodated so as to overlap, in the radial direction, a large-diameter hole 42a formed in an inner diameter portion of the movable plate 42 of the brake mechanism 40. The large-diameter hole 42a has an inner diameter larger than the outer diameter of the outer clutch 302.

The protruding stepped portion 301b in which an outer diameter portion on the input shaft 51 side is reduced in the inner radial direction is formed on the inner clutch 301, a recessed stepped portion 302b in which an inner diameter portion on the motor shaft 221 side is enlarged in the external radial direction is formed on the outer clutch 302, and the protruding stepped portion 301b is inserted into the recessed stepped portion 302b in a slidable manner.

In addition, a tapered portion 301c is formed on the end face of the outer spline 301a of the inner clutch 301 in the axial direction, and a tapered portion 303c is formed on the end face of the inner spline 303a of the sleeve 303 in the axial direction.

If the clutch mechanism and the brake mechanism are separately disposed, there is a dead space, which may cause a decrease in the layout efficiency. In contrast, in the present embodiment, the clutch mechanism 30 is housed so as to overlap, in the radial direction, the large-diameter hole 42a formed in the movable plate 42 of the brake mechanism 40, and thus a structure that is more compact in the axial direction can be realized while securing the interlocking length of the clutch mechanism.

In addition, a protruding stepped portion 303b in which an outer diameter portion on the input shaft 51 side is reduced in the inner radial direction is formed on the sleeve 303. The protruding stepped portion 303b has an outer diameter smaller than the inner diameter of the large-diameter hole 42a of the movable plate 42, and is extended on the brake plate 41 side (output-side). As a result of the sleeve 303 being configured in this manner, the clutch mechanism 30 can be switched to the locked state or the unlocked state without interfering with the movable plate 42 even if the sleeve 303 is moved.

In addition, if the shift amounts of the motor shaft 221 and the input shaft 51 from the central axis is large, shaft runout occurs due to rotation, and, if the sleeve 303 is moved directly between the motor shaft 221 and the input shaft 51, there are cases where defects such as wearing of the sleeve 303 and a switch not being smoothly made occur. In contrast, in the present embodiment, a structure is adopted in which the protruding stepped portion 301b of the inner clutch 301 spline-coupled to the motor shaft 221 is inserted into the recessed stepped portion 302b of the outer clutch 302 spline-coupled to the input shaft 51. This enables positioning of the axis center of the inner clutch 301 and the outer clutch 302, thus shaft runout can be suppressed, and the clutch mechanism 30 can be smoothly switched.

In addition, as a result of the tapered portion 301c being formed on the end face of the outer spline 301a of the inner clutch 301 in the axial direction, and the tapered portion 303c being formed on the end face of the inner spline 303a of the sleeve 303 in the axial direction, the assemblability of components and the operability when locking (easiness to enter the locked state) are improved.

Arrangement of Clutch Rod and Brake Rod

Next, a detailed configuration of the clutch mechanism 30 and the brake mechanism 40, and arrangement of the clutch rod 32 and the brake rod 43, in the driving apparatus 100 according to the present embodiment, will be described with reference to FIGS. 6A and 6B in addition to FIGS. 1 to 4B. Note that, in FIGS. 6A and 6B, the same reference numerals are given to the same configurations as those in FIGS. 1 to 4B.

Figure 6A:
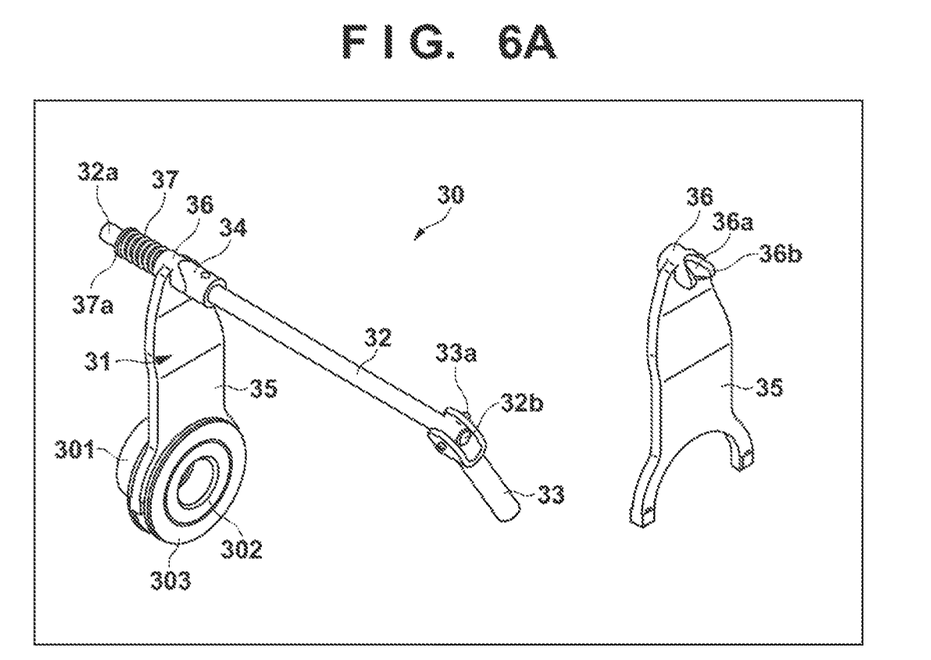
FIG. 6A is an external view of a clutch operation unit of the driving apparatus according to the embodiment of the present invention.
Figure 6B:
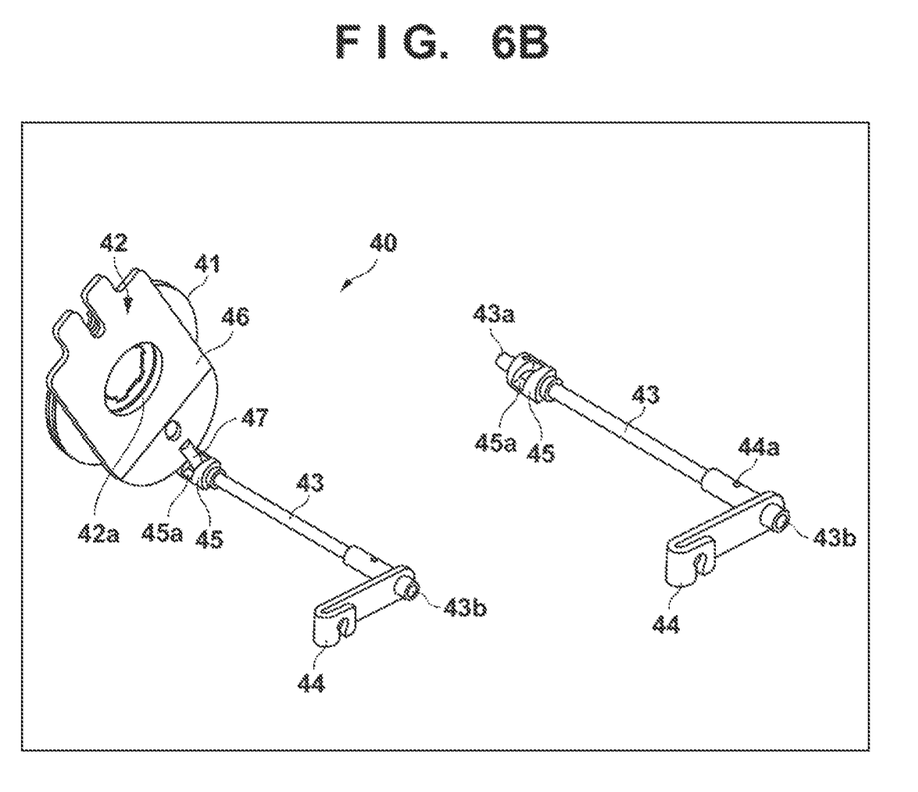
FIG. 6B is an external view of a brake operation unit in the driving apparatus according to the embodiment of the present invention.

FIG. 6A is an external view of the clutch mechanism 30 in the driving apparatus 100 according to the present embodiment. FIG. 6B is an external view of the brake mechanism 401n the driving apparatus 100 according to the present embodiment.

In the driving apparatus 100 according to the present embodiment, the clutch rod 32 and the brake rod 43 are arranged so as to pass through the positioning holes 213a of the stator iron core 213 that holds the stator portion 21 of the motor 20. One of the plurality of positioning holes 213a provided in the stator iron core 213 is used for the clutch rod 32, and another one is used for the brake rod 43.

First, the clutch mechanism 30 will be described.

The clutch rod 32 is rotatable about the central axis via the lever portion 33, and the sleeve 303 moves between the inner clutch 301 and the outer clutch 302 in conjunction with rotation of the clutch rod 32 in accordance with a switch being made between the locked state and the unlocked state. The clutch rod 32 includes a cam portion 34, the clutch arm 31 is inserted into an output-side end portion 32a of the clutch rod 32, and the lever portion 33 is connected to an input-side end portion 32b of the clutch rod 32 exposed from the input-side cover portion 13.

The clutch arm 31 includes a plate-like arm body portion 35, a slide portion 36 that is slidably inserted into the outer periphery face of the clutch rod 32, and a spring 37 that biases the slide portion 36 in the locking direction. The spring 37 is held between a flange portion 37a and the slide portion 36 provided in the vicinity of the output-side end portion 32a of the clutch rod 32, in a compressed manner. The slide portion 36 includes a hole portion 36a into which the clutch rod 32 is inserted and a recessed/protruding notch 36b that engages the cam portion 34 and is symmetrical relative to the axis, and this notch 36b is engaged with the cam portion 34 fixed to the clutch rod 32. In addition, when the clutch rod 32 rotates about the central axis, the cam portion 34 pushes forward the notch 36b in the axial direction, and the notch 36b moves against biasing force of the spring 37 along the clutch rod 32 in the unlocking direction.

The output-side end portion 32a of the clutch rod 32 is supported by a rod supporting hole 12d formed in an input-side end portion 12c of the output-side housing 12.

Next, the brake mechanism 40 will be described.

The brake rod 43 is rotatable about the central axis via the lever portion 44, and the movable plate 42 displaces into the braking state or the non-braking state in conjunction with rotation of the brake rod 43. The brake rod 43 includes a cam portion 45 fixed in the vicinity of an output-side end portion 43a of the brake rod 43, and the movable plate 42 is engaged with the cam portion 45. The lever portion 44 is connected to an input-side end portion 43b of the brake rod 43 exposed from the input-side cover portion 13. The movable plate 42 includes a plate body 46 that abuts on the brake plate 41 and a projection 47 that engages with the cam portion 45. A cam groove 45a inclined in the axial direction is formed in the cam portion 45, and the projection 47 of the movable plate 42 is engaged with this cam groove 45a. In addition, when the brake rod 43 rotates about the central axis, the projection 47 moves in the axial direction along the cam groove 45a of the cam portion 45, and the movable plate 42 displaces along the brake rod 43 in the braking direction.

The output-side end portion 43a of the brake rod 43 is supported by a rod-supporting hole 12e formed in the input-side end portion 12c of the output-side housing 12.

In addition, in order to prevent lubricant oil from entering the motor chamber V1 from the clutch brake chamber V2, the clutch rod 32 and the brake rod 43 are sealed from the input-side housing 11 respectively using sealing materials 38 and 48 that are O-rings or oil seal.

If the clutch rod 32 and the brake rod 43 are arranged outward of the stator iron core 213 of the motor 20 in the radial direction, the size of the driving apparatus 100 in the radial direction is larger than that of when the clutch mechanism 30 and the brake mechanism 40 are not provided.

In contrast, in the present embodiment, as a result of the clutch rod 32 and the brake rod 43 passing through the positioning holes 213a of the stator iron core 213, operating portions of the clutch mechanism 30 and the brake mechanism 40 can be accommodated inward of the outer shape of the motor 20, and thus it is possible to reduce the size of the driving apparatus 100 in the radial direction.

Moreover, the clutch rod 32 and the brake rod 43 are sealed from the input-side housing 11 using O-rings, oil seal, or the like, which holds the sealability against rotational movement of a shaft, but does not hold the sealability if movement in the axial direction is repeated, and thus a configuration is adopted in which the cam portion 34 is provided hi the output-side end portion 32a of the clutch rod 32, and the clutch arm 31 moves in the axial direction due to rotation of the clutch rod 32.

In addition, the clutch rod 32 and the brake rod 43 are inserted into the positioning holes 213a of the stator iron core 213, and the lever portions 33 and 44 are respectively fixed using spring pins 33a and 44a such that the input-side cover portion 13 can be attached/detached again during maintenance. Due to such a configuration, the clutch rod 32 and the brake rod 43 can be removed.

Summary of Embodiment

First Aspect

A driving apparatus 100 including:
a motor 20 that generates drive power; and
power transmission units 30, 40, and 50 that transmit drive power of the motor 20 to an output shaft 60,
wherein the power transmission units 30, 40, and 50 include a brake mechanism 40 that brakes rotation of the output shaft 60 and a deceleration mechanism 50 that converts a torque of the motor 20, and transmits a resultant to the output shaft 60, and
wherein the brake mechanism 40 is arranged at a part before the deceleration mechanism 50, and the deceleration mechanism 50 is arranged at a part before the output shaft 60.

According to the first aspect, it is possible to reduce the size from the motor 20 to the output shaft 60 in the radial direction of the shaft, and to improve the layout efficiency. In addition, since a torque before deceleration of the output shaft 60 is smaller than a torque after deceleration, the brake capacity can be reduced, and it is possible to reduce the sizes of the constituent elements of the brake mechanism 40. Moreover, when the driving apparatus 100 is mounted in a work machine, it is possible to reduce the diameter and capacity of the brake on a traveling wheel side.

Second Aspect

In the first aspect, a clutch mechanism 30 that switches between a state where the motor 20 and the output shaft 60 are connected and a state where the motor 20 and the output shaft 60 are disconnected is included, and
the clutch mechanism 30 is arranged between the motor 20 and the brake mechanism 40.

According to the second aspect, a rotation driving unit such as a traveling wheel connected to the output shaft 60 freely rotates by preventing the brake mechanism 40 and the deceleration mechanism 50 from being affected by a cogging torque of the motor 20. As a result, it becomes easy to operate a work machine or a vehicle in which the rotation driving unit and the driving apparatus 100 are mounted, when the motor is not driven.

Third Aspect

In the second aspect, the deceleration mechanism 50 includes an input shaft 51 that is connected to or disconnected from a motor shaft 221 of the motor 20 by the clutch mechanism 30, and
the motor shaft 221, the input shaft 51, and the output shaft 60 are coaxially arranged.

According to the third aspect, the motor shaft 221 to the output shaft 60 can be arranged lineally in the axial direction, and thus the size of the shaft in the radial direction can be reduced, and the layout efficiency can be improved.

Fourth Aspect

In the third aspect, an end portion 61 of the output shaft 60 on the deceleration mechanism 50 side is rotatably supported by the input shaft 51.

According to the fourth aspect, a space in the axial direction can be saved.

Fifth Aspect

In the fourth aspect, a plurality of reduction gears 52c of the deceleration mechanism 50 are arranged on the outer circumference of the input shaft 51 that pivotally supports the output shaft 60.

According to the fifth aspect, space around an axis centered on the input shaft 51 can be saved.

What is claimed is:

1. A driving apparatus comprising:
    a motor that generates drive power; and
    a power transmission unit that transmits drive power of the motor to an output shaft,
    wherein the power transmission unit includes a brake mechanism that brakes rotation of the output shaft, a deceleration mechanism that converts a torque of the motor, and transmits a resultant to the output shaft, and a clutch mechanism that switches between a state where the motor and the output shaft are connected and a state where the motor and the output shaft are disconnected is included,
    wherein the brake mechanism is arranged upstream of the deceleration mechanism in a direction in which the drive power of the motor is transmitted to the output shaft, and the deceleration mechanism is arranged upstream of the output shaft in the direction in which the drive power of the motor is transmitted to the output shaft,
    the clutch mechanism is arranged between the motor and the brake mechanism,
    the deceleration mechanism includes an input shaft that is connected to or disconnected from a motor shaft of the motor by the clutch mechanism, and
    the motor shaft, the input shaft, and the output shaft are coaxially arranged.

2. The apparatus according to claim 1, wherein an end portion of the output shaft on the deceleration mechanism side is rotatably supported by the input shaft.

3. The apparatus according to claim 2, wherein a plurality of reduction gears of the deceleration mechanism are arranged on the outer circumference of the input shaft that pivotally supports the output shaft.

* * * * *